(12) United States Patent
Wu et al.

(10) Patent No.: US 12,282,771 B2
(45) Date of Patent: Apr. 22, 2025

(54) ADDITION MASK VALUE GENERATOR, ENCRYPTOR AND METHOD FOR GENERATING STREAM KEY

(71) Applicant: Nuvoton Technology Corporation, Hsinchu Science Park (TW)

(72) Inventors: Kun-Yi Wu, Tainan (TW); Yu-Shan Li, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 321 days.

(21) Appl. No.: 18/090,818

(22) Filed: Dec. 29, 2022

(65) Prior Publication Data
US 2023/0214216 A1    Jul. 6, 2023

(30) Foreign Application Priority Data
Dec. 30, 2021  (TW) .................................. 110149573

(51) Int. Cl.
*G06F 9/30*    (2018.01)
(52) U.S. Cl.
CPC ........ *G06F 9/30018* (2013.01); *G06F 9/3001* (2013.01); *G06F 9/30029* (2013.01); *G06F 9/30032* (2013.01); *G06F 9/30038* (2023.08)
(58) Field of Classification Search
None
See application file for complete search history.

(56) References Cited

U.S. PATENT DOCUMENTS

| 7,386,130 | B2 * | 6/2008 | Ito ........................... H04L 9/003 380/263 |
| 8,009,827 | B2 | 8/2011 | Okochi et al. |
| 8,903,882 | B2 | 12/2014 | Boersma et al. |

(Continued)

FOREIGN PATENT DOCUMENTS

| EP | 1833190 A1 * | 9/2007 | ............... G09C 1/00 |
| TW | 201445965 A | 12/2014 | |

OTHER PUBLICATIONS

'LSB Based Audio Steganography using RSA and ChaCha20 Encryption' by Ganwani et al., Jul. 6-8, 2021. (Year: 2021).*

(Continued)

*Primary Examiner* — Steven G Snyder
(74) *Attorney, Agent, or Firm* — Muncy, Geissler, Olds & Lowe, P.C.

(57) ABSTRACT

An addition mask value generator is provided. A first operation circuit is configured to obtain first intermediate data according to first output mask value and fourth output mask value. A second operation circuit is configured to obtain the addition output mask value of a first mask group according to first intermediate data and fourth input mask value. A third operation circuit is configured to obtain second intermediate data according to second output mask value and third output mask value. A fourth operation circuit is configured to obtain the addition output mask value of a second mask group according to second intermediate data and second input mask value. The first and second addition input mask values of first mask group are first and second input mask values. The first and second addition input mask values of second mask group are third input mask value and first intermediate data.

20 Claims, 6 Drawing Sheets

(56) References Cited

U.S. PATENT DOCUMENTS

| | | | |
|---|---|---|---|
| 9,049,004 B2* | 6/2015 | Kang | H04L 9/003 |
| 10,256,973 B2* | 4/2019 | Kumar | H04L 9/003 |
| 10,581,588 B2* | 3/2020 | Wurcker | G09C 1/00 |
| 2003/0048903 A1* | 3/2003 | Ito | H04L 9/003 380/263 |
| 2005/0232430 A1* | 10/2005 | Gebotys | H04L 9/003 380/286 |
| 2007/0140478 A1* | 6/2007 | Komano | H04L 9/0618 380/28 |
| 2012/0150933 A1 | 6/2012 | Boersma et al. | |
| 2014/0153725 A1* | 6/2014 | Kang | H04L 9/003 380/277 |
| 2018/0097618 A1* | 4/2018 | Kumar | H03K 19/215 |
| 2019/0042249 A1 | 2/2019 | Suresh et al. | |
| 2021/0173618 A1 | 6/2021 | Hutter et al. | |
| 2024/0113871 A1* | 4/2024 | Shimokawa | H04L 9/003 |
| 2024/0275579 A1* | 8/2024 | Mirkin | H04L 9/008 |

OTHER PUBLICATIONS

'The Design of Chacha20' by Loup, Jan. 2017. (Year: 2017).*
'Boosting Authenticated Encryption Robustness with Minimal Modifications' by Tomer Ashur et al., copyright International Association for Cryptologic Research 2017. (Year: 2017).*
Machine Translation of Korean Patent Application KR 20170025523 A, 2017. (Year: 2017).*
Machine Translation of Japanese Patent Application JP 2014119512 A, 2014. (Year: 2014).*
Machine Translation of Japanese Patent Application JP 2010245753 A, 2010. (Year: 2010).*

* cited by examiner

```
chacha20_block(key[255:0], counter[31:0], nonce[127:0]):
    state[511:0] = constants[127:0] | key | counter | nonce
    working_state = state
    for i=1 upto 10
        Qround(working_state, 0, 4, 8,12)
        Qround(working_state, 1, 5, 9,13)
        Qround(working_state, 2, 6,10,14)
        Qround(working_state, 3, 7,11,15)
        Qround(working_state, 0, 5,10,15)
        Qround(working_state, 1, 6,11,12)
        Qround(working_state, 2, 7, 8,13)
        Qround(working_state, 3, 4, 9,14)
    end
    state += working_state
    return serialize(state)
end
```

FIG. 2

ADDITION MASK VALUE GENERATOR, ENCRYPTOR AND METHOD FOR GENERATING STREAM KEY

CROSS REFERENCE TO RELATED APPLICATIONS

This Application claims priority of Taiwan Patent Application No. 110149573, filed on Dec. 30, 2021, the entirety of which is incorporated by reference herein.

BACKGROUND OF THE INVENTION

Field of the Invention

The invention relates to an encryptor, and more particularly to a ChaCha20 encryptor using secure adders.

Description of the Related Art

In recent years, encryption and decryption applications (such as add-rotate-xor (ARX)) have been used widely in various electronic products, as encryption and decryption applications help to protect confidential information and prevent data from being stolen. Addition is an important function of many operations, so adders are widely used in signal processing, data protection, and other applications. A common and effective general protection mechanism is the exclusion-OR (XOR) masking technology, which utilizes random numbers and important data (or variables) in an encryption and decryption algorithm to perform an XOR operation to complete the mask protection mechanism. Encryption and decryption applications need a secure adder that can perform secure addition operations.

A "secure addition operation" is one in which a secure adder can complete an addition operation without removing the mask of the input data, and without revealing the original value of the input data in the calculation process, to provide an output that is protected by a mask value. In various integrated circuits (ICs) or electronic products that perform encryption and decryption operations, secure adders capable of performing secure addition operations are widely used to protect the data to be computed.

BRIEF SUMMARY OF THE INVENTION

An addition mask value generator, an encryptor, and a method for generating a stream key are provided. An embodiment of the addition mask value generator is provided. The addition mask value generator is configured to provide a first addition input mask value, a second addition input mask value, and an addition output mask value for a plurality of mask groups according to a first input mask value, a second input mask value, a third input mask value, and a fourth input mask value, as well as a first output mask value, a second output mask value, a third output mask value, and a fourth output mask value. The addition mask value generator includes a first operation circuit, a second operation circuit, a third operation circuit and a fourth operation circuit. The first operation circuit is configured to obtain first intermediate data according to the first output mask value and the fourth output mask value. The second operation circuit is configured to obtain the addition output mask value of the first mask group according to the first intermediate data and the fourth input mask value. The third operation circuit is configured to obtain second intermediate data according to the second output mask value and the third output mask value. The fourth operation circuit is configured to obtain the addition output mask value of the second mask group according to the second intermediate data and the second input mask value. The first addition input mask value of the first mask group is the first input mask value, and the second addition input mask value of the first mask group is the second input mask value. The first addition input mask value of the second mask group is the third input mask value, and the second addition input mask value of the second mask group is the first intermediate data.

Moreover, an embodiment of an encryptor is provided. The encryptor includes a mask generator, a controller, and at least one operator. The mask generator includes a random number generator, a register and an addition mask value generator. The random number generator is configured to randomly provide a first output mask value, a second output mask value, a third output mask value and a fourth output mask value. The register is configured to provide a first input mask value, a second input mask value, a third input mask value and a fourth input mask value. The addition mask value generator is configured to provide the first addition input mask value, the second addition input mask value, and the addition output mask value of a plurality of mask groups according to the first, second, third, and fourth input mask values and the first, second, third, and fourth output mask values. The controller is configured to provide a first masked input data, a second masked input data, a third masked input data, and a fourth masked input data according to the first, second, third, and fourth input mask values, respectively. The operator is configured to obtain a first masked output data, a second masked output data, a third masked output data, and a fourth masked output data according to the first, second, third, and fourth masked input data and the first addition input mask values, the second addition input mask value, and the addition output mask value of the mask groups. The controller is configured to provide a stream key according to the first, second, third, and fourth masked output data and the first, second, third, and fourth output mask values, and the stream key conforms to ChaCha20 encryption.

Moreover, a method for generating a stream key for ChaCha20 encryption is provided. Four output mask values are obtained through a random number generator. Mask operations are performed on four input values according to four input mask values to obtain individual masked input data. Four mask groups are generated according to the four input mask values and the four output mask values, wherein each of the mask groups includes a first addition input mask value, a second addition input mask value and an addition output mask value. The four mask groups are used to perform corresponding quarter-rounds on the masked input data to obtain corresponding masked output data. A stream key is obtained according to the masked output data and the four output mask values.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 2 shows a ChaCha20 algorithm according to some embodiments of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
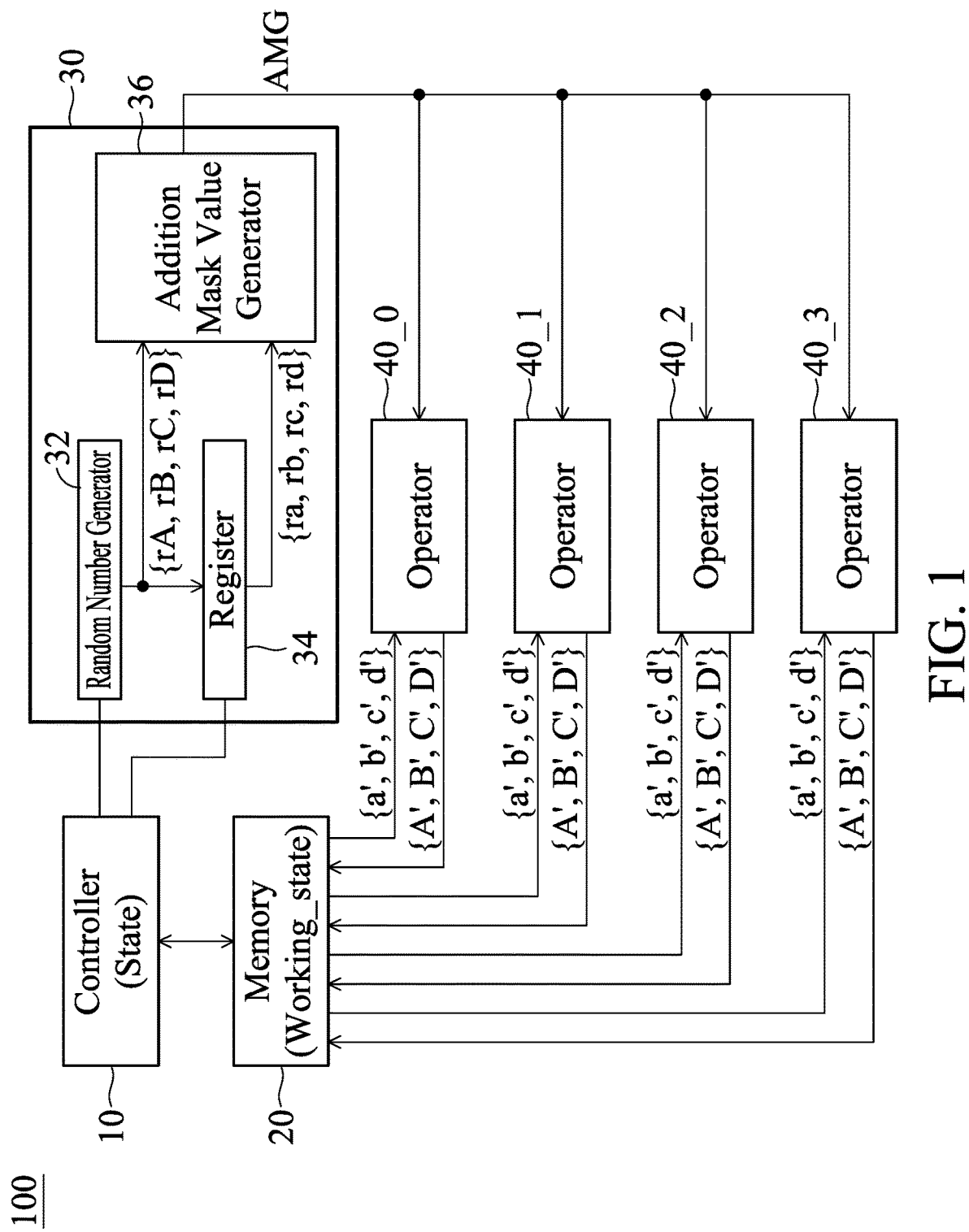
FIG. 1 shows an encryptor according to some embodiments of the invention.

FIG. 1 shows an encryptor 100 according to some embodiments of the invention. The encryptor 100 may be implemented in an integrated circuit (IC) (not shown). The encryptor 100 includes a controller 10, a memory 20, a mask generator 30, and the operation circuits 40_0 through 40_3. In such embodiment, the number of operation circuits 40_0 through 40_3 used is only an example, and is not intended to limit the invention. In addition, by using the mask value generator 30, the encryptor 100 can complete the ChaCha20 encryption algorithm without revealing the operands.

FIG. 2 shows a ChaCha20 algorithm according to some embodiments of the invention. Referring to FIG. 1 and FIG. 2 together, the 512-bit state (i.e., state[511:01]) of the ChaCha20 algorithm is composed of a 128-bit constant (i.e., constant[127:0]), a 256-bit key (i.e., key[255:0]), a 32-bit counter (i.e., counter[31:0]) and a 96-bit non-repeating random value (i.e., nonce[95:0]). First, the controller 10 is configured to write the content value of the 512-bit state into the memory 20 as the 512-bit working state (i.e., working_state[511:0]). Next, the encryptor 100 is configured to perform 10 computation loops using the operators 40_0 through 40_3 and the mask value AMG from the mask generator 30, and each computation loop is configured to perform eight quarter-rounds (Qround), which is equal to two rounds in total. When each quarter-round is performed, four 32-bit input values (i.e., a[31:0], b[31:0], c[31:0] and d[31:0], hereinafter referred to simply as input values a, b, c and d) are required to input to the corresponding operators. Each of the operators 40_0 through 40_3 is configured to perform an add-rotate-xor (ARX) operation corresponding to the ChaCha20 algorithm to obtain four 32-bit output values (i.e., A[31:0], B[31:0], C[31:0], D[31:0], hereinafter referred to as output values A, B, C and D) and stored in the corresponding working status positions in the memory 20. After completing 10 computation loops, the controller 10 is configured to add the 512-bit state (i.e., state[511:0]) and the 512-bit working state (i.e., working_state[511:0]) to obtain a new 512-bit state and sequentially output into a stream key for use by other subsequent circuits The mask generator 30 includes a random number generator (RNG) 32, a register (or memory) 34 and an addition mask value generator 36. The random number generator 32 is configured to generate a plurality of random numbers according to the signals from the controller 10 (e.g., the control signals, the clock signals, etc.), which are used as the output mask values rA, rB, rC and rD and provided to the register 34 and the addition mask value generator 36. When the random number generator 32 provides the output mask values rA, rB, rC and rD to the addition mask value generator 36, the register 34 is configured to simultaneously provide the input mask values ra, rb, rc and rd to the addition mask value generator 36. Then, the addition mask value generator 36 is configured to generate the mask value AMG to the operators 40_0 through 40_3 according to the output mask values rA, rB, rC and rD and the input mask values ra, rb, rc and rd. In addition, after providing the input mask values ra, rb, rc and rd to the addition mask value generator 36, the register 34 is configured to store the output mask values rA, rB, rC and rD as the input mask values ra, rb, rc and rd in the next clock cycle (e.g., in response to the clock signal from the controller 10). In other words, the input mask values ra, rb, rc, and rd provided to the addition mask value generator 36 are the output mask values rA, rB, rC and rD obtained in the previous clock cycle (e.g., in response to the clock signal from the controller 10). In other words, the mask value generator 30 is configured to update the input mask values ra, rb, rc and rd and the output mask values rA, rB, rC and rD at each clock cycle. Furthermore, each adder in the operators 40_0 through 40_3 is configured to perform a secure addition operation on the mask values rx, ry and rz of the corresponding group according to the mask value AMG. For each adder, the mask values rx and ry are the addition input mask values, and the mask value rz is the addition output mask value.

In the encryptor 100, the mask generator 30 is also configured to provide the input mask values ra, rb, rc and rd of the operators 40_0 through 40_3 to the controller 10. Therefore, the controller 10 is configured to perform the mask operations on the input values a, b, c and d according to the input mask values ra, rb, rc and rd, respectively, so as to obtain the masked input data a', b', c' and d', as shown in the following equation (1) through equation (4):

$$a'=a\oplus ra \quad (1);$$

$$b'=b\oplus rb \quad (2);$$

$$c'=c\oplus rc \quad (3); \text{ and}$$

$$d'=d\oplus rd \quad (4).$$

Next, the controller 10 is configured to store the masked input data a', b', c', and d' in the memory 20 so as to provide to the operators 40_0 through 40_3. In addition, the output mask values rA, rB, rC and rD provided by the mask generator 30 are used to provide mask protection for the original output values A, B, C and D to obtain the masked output data A', B', C' and D', as shown in the following equation (5) through equation (8):

$$A'=A\oplus rA \quad (5);$$

$$B'=B\oplus rB \quad (6);$$

$$C'=C\oplus rC \quad (7); \text{ and}$$

$$D'=D\oplus rD \quad (8).$$

Thus, the controller 10 is configured to obtain the original output values A, B, C and D according to the output mask values rA, rB, rC and rD from the mask generator 30 and the masked output data A', B', C' and D' provided to the memory 20 by the operators 40_0 through 40_3. The operations of the addition mask value generator 36 and the operators 40_0 through 40_3 will be described later.

Figure 3:
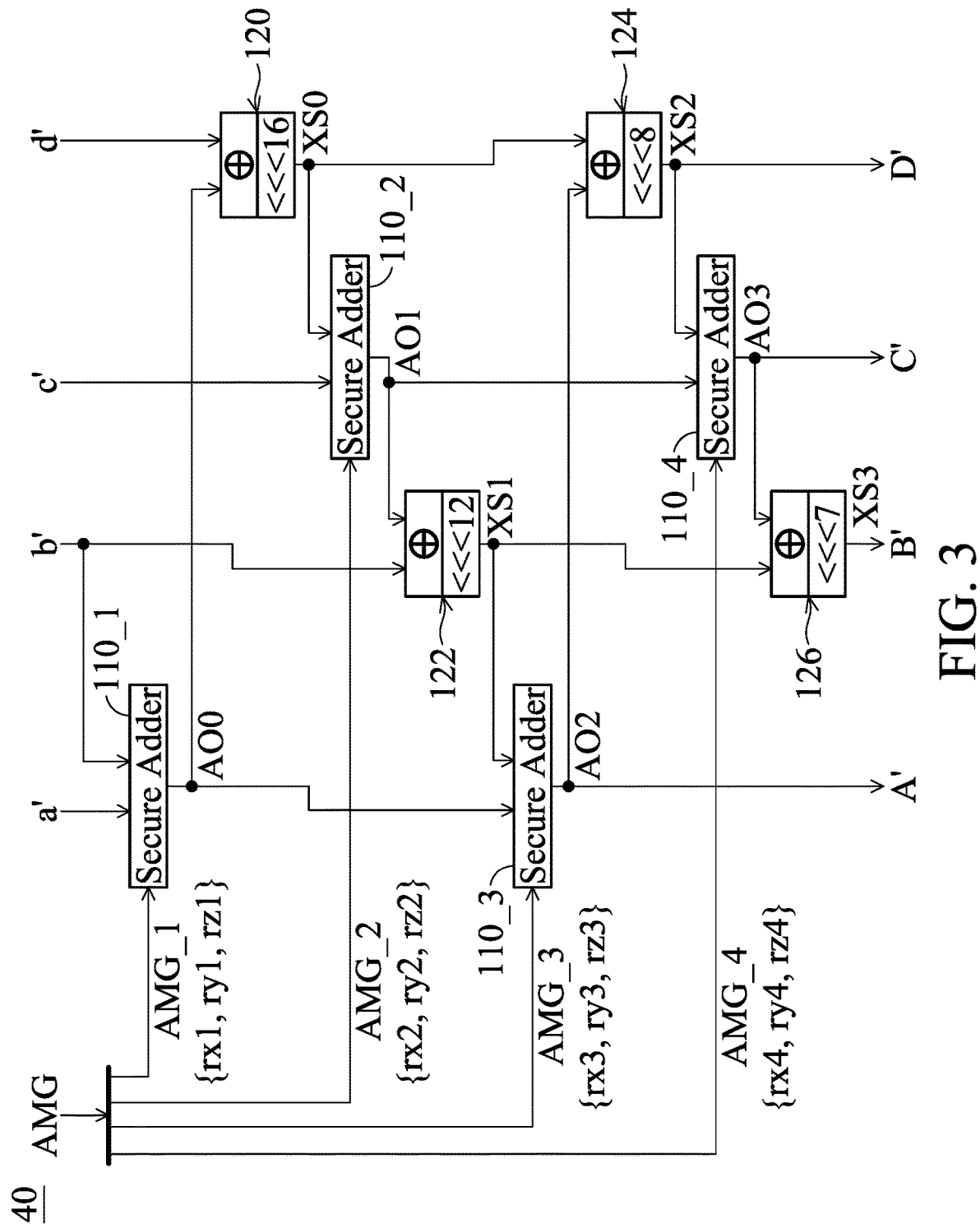
FIG. 3 shows an operator according to some embodiments of the invention.

FIG. 3 shows an operator 40 according to some embodiments of the invention. The operator 40 can be applied to the operators 40_0 through 40_3 that perform quarter-rounds in the encryptor 100 of FIG. 1. The operator 40 includes the secure adders 110_1 through 110_4 and the XOR-circular shift operation units 120, 122, 124 and 126 to sequentially perform the eight operations of the quarter-round. The mask value AMG from the mask generator 30 includes the mask groups AMG_1, AMG_2, AMG_3, and AMG_4. Each of mask groups AMG_1, AMG_2, AMG_3, and AMG_4 includes the corresponding mask values rx, ry, and rz, and is provided to an individual secure adder. For example, the mask value AMG_1 includes the mask values rx1, ry1 and rz1, and is provided to the secure adder 110_1. The mask value AMG_2 includes the mask values rx2, ry2, and rz2, and is provided to the secure adder 110_2. The mask value AMG_3 includes the mask values rx3, ry3 and rz3, and is provided to the secure adder 110_3. The mask value AMG_4 includes the mask values rx4, ry4, and rz4, and is provided to the secure adder 110_4. Furthermore, the secure adders 110_1 through 110_4 have the same circuit configuration.

Figure 4:
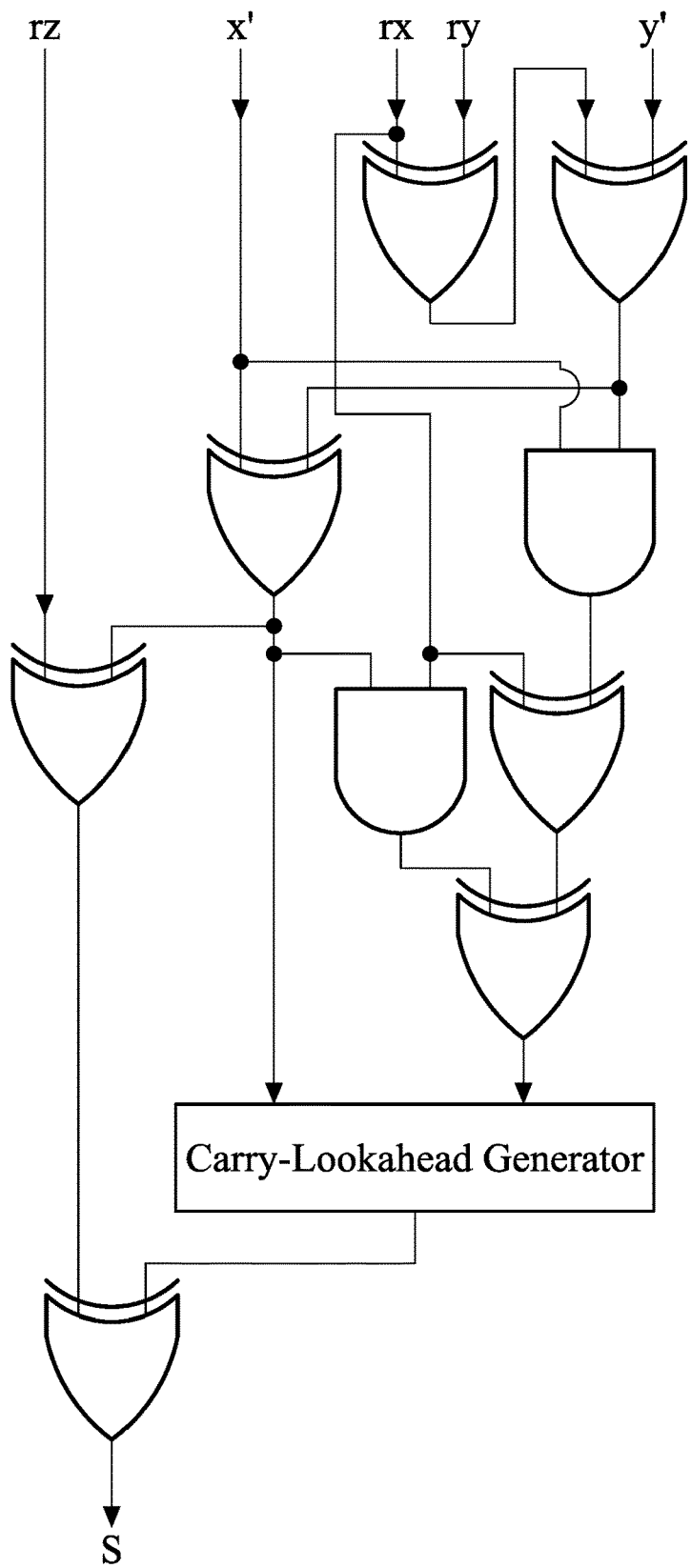
FIG. 4 shows a secure adder according to some embodiments of the invention.

In the operator 40, the mask groups AMG_1, AMG_2, AMG_3 and AMG_4 correspond to the secure adders 110_1, 110_2, 110_3 and 110_4, respectively. In such embodiment, each of secure adders 110_1 through 110_4 is configured to perform the addition operation on two masked data masked by the mask values rx and ry, respectively, and provide the operation result masked by the mask value rz. As shown in FIG. 4, FIG. 4 shows a secure adder 110 according to some embodiments of the invention. In FIG. 4, the secure adder 110 is configured to perform the addition operation on the masked data x' corresponding to the mask value rx and the masked data y' corresponding to the mask value ry, and provide the operation result S corresponding to the mask value ry. In some embodiments, the mask value rx is different from the mask value ry. In some embodiments, the mask value rx is the same as the mask value ry. It should be noted that the secure adder 110 in FIG. 4 is only an example, and is not intended to limit the invention. Any adder that can perform the addition operation on the mask-protected input data and provide mask-protected output without removing the mask values, can be used in the invention.

Referring back to FIG. 3, in a first operation of the quarter-round, the secure adder 110_1 is configured to perform the addition operation on the masked input data a' and b' corresponding to the mask values rx1 and ry1, to obtain the intermediate data AO0 corresponding to the mask value rz1. As described in the equations (1) and (2), the masked input data a' and b' can be obtained by performing the mask operations on the input values a and b according to the input mask values ra and rb, respectively. Therefore, the mask value rx1 and the mask value ry1 are the input mask value ra and the input mask value rb, respectively, as shown in the following equations (9) and (10):

$$rx1 = ra \quad (9); \text{ and}$$

$$ry1 = rb \quad (10).$$

In a second operation of the quarter-round, the XOR-circular shift operation unit 120 is configured to perform an exclusive-OR (XOR) operation on the intermediate data AO0 corresponding to the mask value rz1 and the masked data d' corresponding to the input mask value rd, and perform a 16-bit left cyclic shift (<<<16) on the XOR result to obtain the intermediate data XS0 and its mask value rs1, wherein the mask value rs1 is shown in the following equation (11):

$$rs1 = (rz1 \oplus rd) <<< 16 \quad (11).$$

In a third operation of the quarter round, the secure adder 110_2 is configured to perform the addition operation on the masked input data c' corresponding to the mask value rx2 and the intermediate data XS0 corresponding to the mask value ry2, to obtain the intermediate data AO1 corresponding to the mask value rz2. As described in the equation (3), the masked input data c' is obtained by performing a mask operation on the input value c according to the input mask value rc. Therefore, the mask value rx2 is the input mask value rc, as shown in the following equation (12):

$$rx2 = rc \quad (12).$$

In addition, for the intermediate data XS0, the mask value ry2 is equal to the mask value rs1, as shown in the following equation (13):

$$ry2 = rs1 \quad (13).$$

In a fourth operation of the quarter-round, the XOR-circular shift operation unit 122 is configured to perform an XOR operation on the masked input data b' corresponding to the input mask value rb and the intermediate data AO1 corresponding to the mask value rz2, and perform a 12-bit left cyclic shift (<<<12) on the XOR result to obtain the intermediate data XS1 and its mask value rs2, wherein the mask value rs2 is shown in the following equation (14):

$$rs2 = (rz2 \oplus rb) <<< 12 \quad (14).$$

In a fifth operation of the quarter-round, the secure adder 110_3 is configured to perform an addition operation on the intermediate data AO0 corresponding to the mask value rx3 and the intermediate data XS1 corresponding to the mask value ry3 to obtain the intermediate data AO2 corresponding to the mask value rz3. As described above, the intermediate data AO0 is provided by the secure adder 110_1 according to the mask value rz1. Therefore, the mask value rx3 is equal to the mask value rz1, as shown in the following equation (15):

$$rx3 = rz1 \quad (15).$$

In addition, for the intermediate data XS1, the mask value ry3 is equal to the mask value rs2, as shown in the following equation (16):

$$ry3 = rs2 \quad (16).$$

Furthermore, the masked output data A' corresponding to the output mask value rA is equal to the intermediate data AO2 corresponding to the mask value rz3. Therefore, the mask value rz3 is equal to the output mask value rA, as shown in the following equation (17):

$$rz3 = rA \quad (17).$$

In a sixth operation of the quarter-round, the XOR-circular shift operation unit 124 is configured to perform an XOR operation on the intermediate data AO2 corresponding to the mask value rz3 and the intermediate data XS0 corresponding to the mask value rs1, and perform an 8-bit left cyclic shift (<<<8) on the XOR result to obtain the intermediate data XS2 and its mask value rs3. Furthermore, the masked output data D' corresponding to the output mask value rD is equal to the intermediate data XS2 corresponding to the mask value rs3. Therefore, according to equation (11), the mask value rs3 is shown in the following equation (18):

$$rs3 = (rz3 \oplus rs1) <<< 8 = (rz3 \oplus ((rz1 \oplus rd) <<< 16)) <<< 8 = rD. \quad (18)$$

Therefore, according to equation (17) and equation (18), the value of rz1 is obtained, as shown in the following equation (19):

$$rz1 = (((rD>>>8) \oplus rA)>>>16) \oplus rd \quad (19)$$

In a seventh operation of the quarter-round, the secure adder 110_4 is configured to perform an addition operation on the intermediate data AO1 corresponding to the mask value rx4 and the intermediate data XS2 corresponding to the mask value ry4 to obtain the intermediate data AO3 corresponding to the mask value rz4. As previously described, the intermediate data AO1 is provided by the secure adder 110_2 according to the mask value rz2. Therefore, the mask value rx4 is equal to the mask value rz2, as shown in the following equation (20):

$$rx4 = rz2 \quad (20).$$

Furthermore, the masked output data D' corresponding to the output mask value rD is equal to the intermediate data XS2 corresponding to the mask value ry4. Therefore, the mask value ry4 is equal to the output mask value rD, as shown in the following equation (21):

$$ry4 = rD \quad (21).$$

Moreover, the masked output data C' corresponding to the output mask value rC is equal to the intermediate data AO3 corresponding to the mask value rz4. Therefore, the mask value rz4 is equal to the output mask value rC, as shown in the following equation (22):

$$rz4 = rC \quad (22).$$

In an eighth operation of the quarter-round, the XOR-circular shift operation unit 126 is configured to perform the XOR operation on the intermediate data XS1 corresponding to the mask value rs2 and the intermediate data AO3 corresponding to the output mask value rC, and perform a 7-bit left rotation (<<<7) on the XOR result to obtain the intermediate data XS3 and its mask value rs4. Therefore, according to equation (14), the mask value rs4 is shown in the following equation (23):

$$rs4 = (rC \oplus rs2) <<< 7 = (rC \oplus ((rz2 \oplus rb) <<< 12)) <<< 7. \quad (23)$$

In addition, the masked output data B' corresponding to the output mask value rB is equal to the intermediate data XS3 corresponding to the mask value rs4, as shown in the following equation (24):

$$rs4 = rB \quad (24).$$

Therefore, according to equation (23) and equation (24), the value of rz2 is obtained, as shown in the following equation (25):

$$rz2 = (((rB>>>7) \oplus rC)>>>12) \oplus rb \quad (25).$$

According to the equations (11), (13) and (19), the value of ry2 is obtained, as shown in the following equation (26):

$$ry2 = rs1 = (rz1 \oplus rd) <<< 16 = \quad (26)$$
$$(((((rD >>> 8) \oplus rA) >>> 16) \oplus rd) \oplus rd) <<< 16 =$$
$$(rD >>> 8) \oplus rA.$$

Furthermore, according to equations (14), (16) and (25), the value of ry3 is obtained, as shown in the following equation (27):

$$ry3 = rs2 = (rz2 \oplus rb) <<< 12 = ((((rB >>> 7) \oplus rC) >>> \quad (27)$$
$$12) \oplus rb \oplus rb) <<< 12 = (rB >>> 7) \oplus rC.$$

Figure 5:
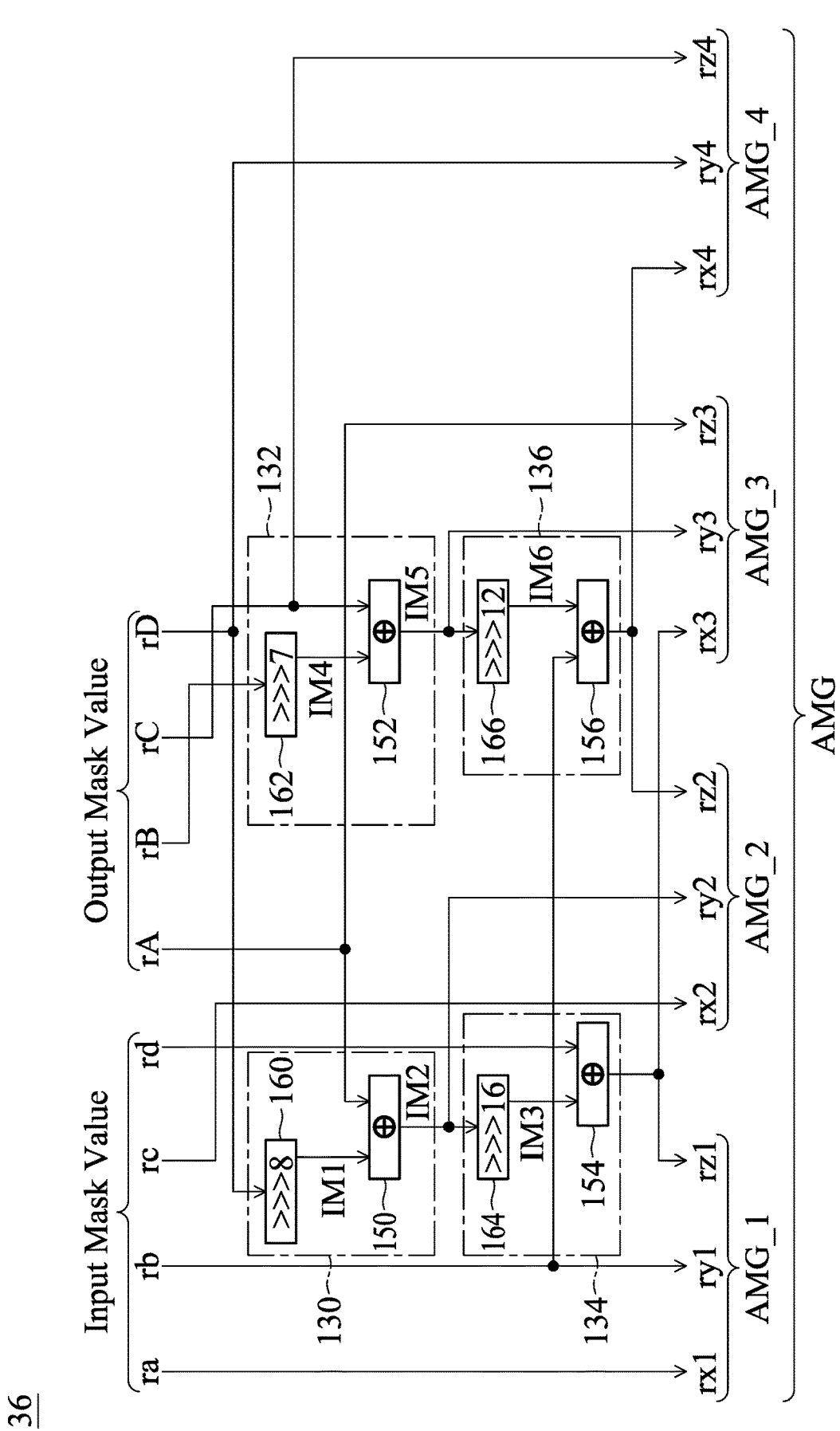
FIG. 5 shows the addition mask value generator of FIG. 1 according to some embodiments of the invention.

FIG. 5 shows the addition mask value generator 36 of FIG. 1 according to some embodiments of the invention. The addition mask value generator 36 is configured to generate the mask values AMG of mask groups AMG_1, AMG_2, AMG_3 and AMG_4 according to the input mask values ra, rb, rc and rd and the output mask values rA, rB, rC and rD. The addition mask value generator 36 includes the operation circuits 130, 132, 134 and 136, and each operation circuit includes an XOR unit and a cyclic shift operation unit.

As shown in the equation (9), the addition mask value generator 36 is configured to directly assign the input mask value ra as the mask value rx1 of the mask group AMG_1. In addition, according to the equation (10), the addition mask value generator 36 is configured to directly assign the input mask value rb as the mask value ry1 of the mask group AMG_1, and provide the input mask value rb to the operation circuit 136. According to equation (12), the addition mask value generator 36 is configured to directly assign the input mask value rc as the mask value rx2 of the mask group AMG_2. According to equation (17), the addition mask value generator 36 is configured to directly assign the output mask value rA as the mask value rz3 of the mask group AMG_3, and provide the output mask value rA to the operation circuit 130. According to the equation (22), the addition mask value generator 36 is configured to directly assign the output mask value rC as the mask value rz4 of the mask group AMG_4, and provide the output mask value rC to the operation circuit 132. According to the equation (21), the addition mask value generator 36 is configured to directly assign the output mask value rD as the mask value ry4 of the mask group AMG_4, and provide the output mask value rD to the operation circuit 130.

The operation circuit 130 includes a cyclic shift operation unit 160 and an XOR unit 150. According to the equation (26), the cyclic shift operation unit 160 is configured to perform an 8-bit right cyclic shift (>>>8) on the output mask value rD to obtain the intermediate data IM1. Next, the XOR unit 150 is configured to perform an XOR operation on the intermediate data IM1 and the output mask value rA to obtain the intermediate data IM2. The addition mask value generator 36 is configured to assign the intermediate data IM2 as the mask value ry2 of the mask group AMG_2. The operation circuit 134 includes a cyclic shift operation unit 164 and an XOR unit 154. According to the equation (19), the cyclic shift operation unit 164 is configured to perform a 16-bit right cyclic shift (>>>16) on the intermediate data IM2 to obtain the intermediate data IM3. Next, the XOR unit 154 is configured to perform an XOR operation on the intermediate data IM3 and the input mask value rd to obtain the mask value rz1 of the mask group AMG_1 and the mask value rx3 of the mask group AMG_3 (as shown in the equation (15)). It should be noted that the operation of the operation circuit 130 corresponds to the XOR-cyclic shift operation unit 124 in FIG. 3, wherein the XOR-cyclic shift operation unit 124 is configured to perform an 8-bit left cyclic shift (<<<8), and the cyclic shift operation unit 160 of the operation circuit 130 is configured to perform an 8-bit right cyclic shift (>>>8). In addition, the operation of the operation circuit 134 corresponds to the XOR-cyclic shift operation unit 120 in FIG. 3, wherein the XOR-cyclic shift operation unit 120 is configured to perform a 16-bit left cyclic shift (<<<16), and the cyclic shift operation unit 164 of the operation circuit 134 is configured to perform a 16-bit right cyclic shift (>>>16).

The operation circuit 132 includes a cyclic shift operation unit 162 and an XOR unit 152. According to equation (27), the cyclic shift operation unit 162 is configured to perform a 7-bit right cyclic shift (>>>7) on the output mask value rB to obtain the intermediate data IM4. Next, the XOR unit 152 is configured to perform an XOR operation on the intermediate data IM4 and the output mask value rC to obtain the intermediate data IM5. The additive mask value generator 36 is configured to assign the intermediate data IM5 as the mask value ry3 of the mask group AMG_3. The operation circuit 136 includes a cyclic shift operation unit 166 and an XOR unit 156. According to the equation (25), the cyclic shift operation unit 166 is configured to perform a 12-bit right cyclic shift (>>>12) on the intermediate data IM5 to obtain the intermediate data IM6. Next, the XOR unit 156 is configured to perform an XOR operation on the intermediate data IM6 and the input mask value rb to obtain the mask value rz2 of the mask group AMG_2 and the mask value rx4 of the mask group AMG_4 (as shown in the equation (20)). It should be noted that the operation of the operation circuit 132 corresponds to the XOR-cyclic shift operation unit 126 in FIG. 3, wherein the XOR-cyclic shift operation unit 126 is configured to perform a 7-bit left cyclic shift (<<<7), and the cyclic shift operation unit 162 of the operation circuit 136 is configured to perform a 7-bit right cyclic shift (>>>7). Furthermore, the operation of the operation circuit 136 corresponds to the XOR-circular shift operation unit 122 in FIG. 3, wherein the XOR-circular shift operation unit 122 is configured to perform a 12-bit left cyclic shift (<<<12), and the cyclic shift operation unit 166 of the operation circuit 136 is configured to perform a 12-bit right cyclic shift (>>>12).

In FIG. 5, by using the XOR units (or XOR gates) 150, 152, 154 and 156 and the cyclic shift operation units (or cyclic shifters) 160, 162, 164 and 166, the addition mask value generator 36 can generate all addition input mask values (e.g., the mask values rx1 through rx4 and the mask values ry1 through ry4) and all addition output mask values (e.g., the mask values rz1 through rz4) for the addition operations required in the ChaCha20 encryption algorithm.

Figure 6:
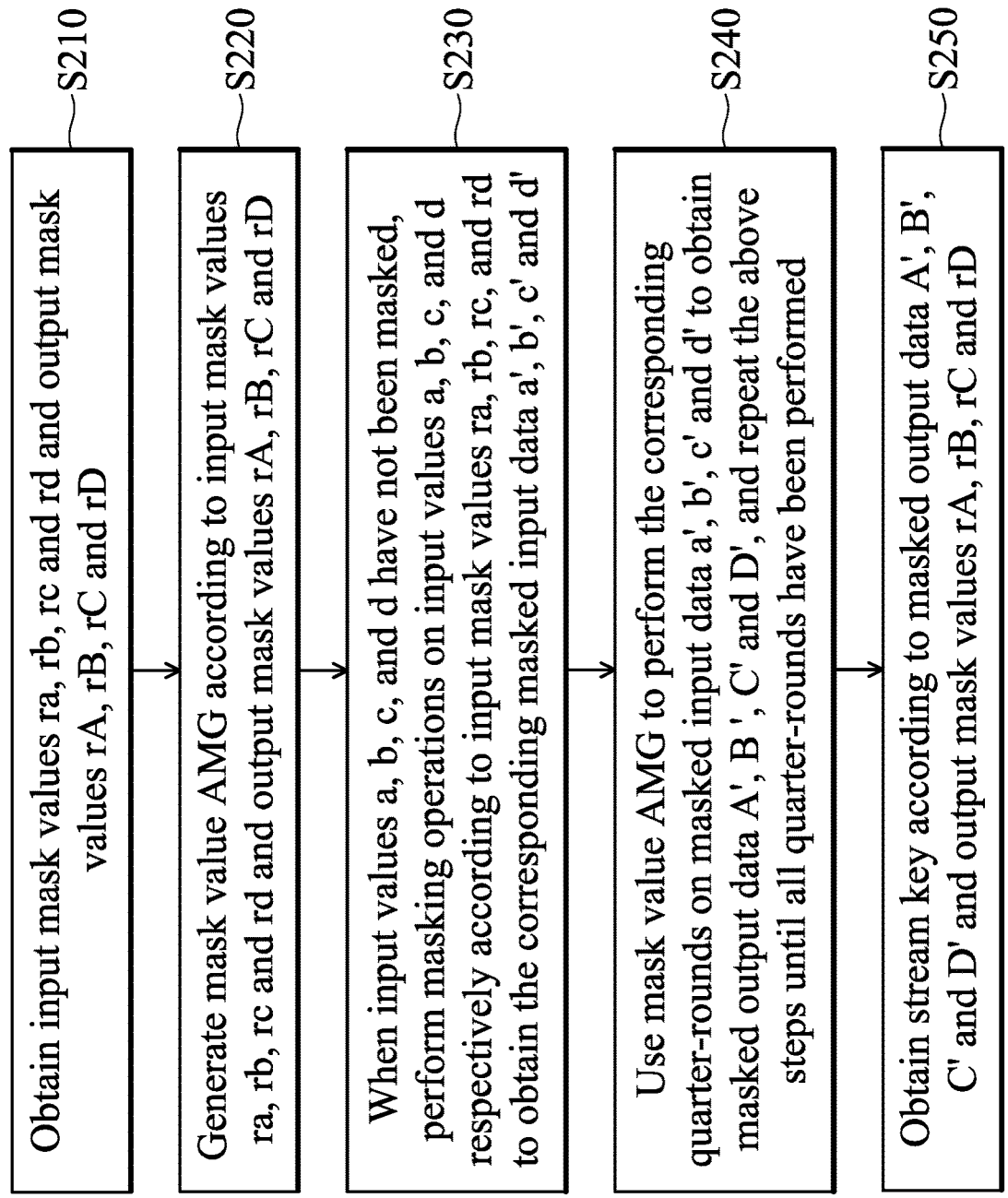
FIG. 6 shows a method for generating a stream key according to some embodiments of the invention, which is suitable for the encryption operation of ChaCha20 algorithm.

FIG. 6 shows a method for generating a stream key according to some embodiments of the invention, which is suitable for the encryption operation of ChaCha20 algorithm. The method of generating the stream key of FIG. 6 may be performed by the encryptor 100 of FIG. 1.

First, in step S210, the input mask values ra, rb, rc and rd and the output mask values rA, rB, rC and rD are obtained. As previously described, the output mask values rA, rB, rC and rD and the input mask values ra, rb, rc and rd may be random numbers. Furthermore, the input mask values ra, rb, rc and rd are the output mask values rA, rB, rC and rD of the previous clock cycle.

Next, in step S220, a mask value AMG is generated according to the input mask values ra, rb, rc and rd and the output mask values rA, rB, rC and rD. As previously described, the mask value AMG includes the mask groups AMG_1, AMG_2, AMG_3, and AMG_4. Additionally, each of the mask groups AMG_1, AMG_2, AMG_3, and AMG_4 includes the corresponding mask values rx, ry, and rz. As previously described, the mask value AMG is generated by four XOR units (e.g., the XOR units 150 through 156 of FIG. 5) and four cyclic shift operation units (e.g., the cyclic shift operation units 160 through 166 of FIG. 5), wherein the shift direction of each cyclic shift operation unit is opposite to the direction of the corresponding cyclic shift in the quarter-round. In addition, the number of shifts of each cyclic shift operation unit is the same as the number of shifts of the corresponding cyclic shift in a quarter-round.

In step S230, when the input values a, b, c, and d have not been masked, the corresponding masked input data a', b', c' and d' are obtained by respectively performing the masking operations on the input values a, b, c, and d according to the input mask values ra, rb, rc, and rd. In some embodiments, the order of step S220 and step S230 may be reversed.

In step S240, the corresponding quarter-rounds are performed on the masked input data a', b', c' and d' by using the mask value AMG to obtain the masked output data A', B C' and D'. Repeat the above steps until the eight quarter-rounds of each calculation loop have been performed.

In step S250, a new bit working state is obtained according to the masked output data A', B', C' and D' and the output mask values rA, rB, rC and rD, and sequentially output as a string stream key. Thus, the encryption operation of ChaCha20 is completed.

According to the embodiments of the invention, when performing the quarter-rounds of ChaCha20, the mask generator 30 is used to generate the addition input mask value and the addition output mask value required by the secure adder, so as to protect the key variables in the ChaCha20 operation from being attacked by power analysis and leaking important information.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An addition mask value generator for providing a first addition input mask value, a second addition input mask value, and an addition output mask value for a plurality of mask groups according to a first input mask value, a second input mask value, a third input mask value, a fourth input mask value, a first output mask value, a second output mask value, a third output mask value and a fourth output mask value, the addition mask value generator comprising:
   a first operation circuit configured to obtain first intermediate data according to the first output mask value and the fourth output mask value;
   a second operation circuit configured to obtain an addition output mask value of a first mask group of the mask groups according to the first intermediate data and the fourth input mask value;
   a third operation circuit configured to obtain second intermediate data according to the second output mask value and the third output mask value; and
   a fourth operation circuit configured to obtain an addition output mask value of a second mask group of the mask groups according to the second intermediate data and the second input mask value,
   wherein a first addition input mask value of the first mask group is the first input mask value, and a second addition input mask value of the first mask group is the second input mask value, wherein a first addition input mask value of the second mask group is the third input mask value, and a second addition input mask value of the second mask group is the first intermediate data.

2. The addition mask value generator as claimed in claim 1, wherein the first addition input mask value of a third mask group of the mask groups is the same as the addition output mask value of the first mask group, the second addition input mask value of the third mask group is the second intermediate data, and the addition output mask value of the third mask group is the first output mask value.

3. The addition mask value generator as claimed in claim 1, wherein the first addition input mask value of a fourth mask group of the mask groups is the same as the addition output mask value of the second mask group, the second addition input mask value of the fourth mask group is the fourth output mask value, and the addition output mask value of the fourth mask group is the third output mask value.

4. The addition mask value generator as claimed in claim 1, wherein the first operation circuit comprises:
a first cyclic shifter configured to perform an 8-bit right cyclic shift on the fourth output mask value to obtain third intermediate data; and
a first exclusive-OR (XOR) gate configured to receive the third intermediate data and the first output mask value to provide the first intermediate data.

5. The addition mask value generator as claimed in claim 1, wherein the second operation circuit comprises:
a second cyclic shifter configured to perform a 16-bit right cyclic shift on the first intermediate data to obtain fourth intermediate data; and
a second exclusive-OR (XOR) gate configured to receive the fourth intermediate data and the fourth input mask value to provide the addition output mask value of the first mask group.

6. The addition mask value generator as claimed in claim 1, wherein the third operation circuit comprises:
a third cyclic shifter configured to perform a 7-bit right cyclic shift on the second output mask value to obtain fifth intermediate data; and
a third exclusive-OR (XOR) gate configured to receive the fifth intermediate data and the third output mask value to provide the second intermediate data.

7. The addition mask value generator as claimed in claim 1,
wherein the fourth operation circuit comprises:
a fourth cyclic shifter configured to perform a 12-bit right cyclic shift on the second intermediate data to obtain sixth intermediate data; and
a fourth exclusive-OR (XOR) gate configured to receive the sixth intermediate data and the second input mask value to provide the addition output mask value of the second mask group.

8. The addition mask value generator as claimed in claim 1, wherein each of the first, second, third, and fourth operation circuits comprises a cyclic shifter and an exclusive-OR (XOR) gate, and each of the cyclic shifters is configured to perform a right cyclic shift on a different number of bits.

9. The addition mask value generator as claimed in claim 1, wherein each of the mask groups corresponds to an individual secure adder that executes a ChaCha20 encryption algorithm.

10. An encryptor, comprising:
a mask generator, comprising:
a random number generator configured to randomly provide a first output mask value, a second output mask value, a third output mask value, and a fourth output mask value;
a register configured to provide a first input mask value, a second input mask value, a third input mask value, and a fourth input mask value; and
an addition mask value generator configured to provide a first addition input mask value, a second addition input mask value, and an addition output mask value of a plurality of mask groups according to the first, second, third, and fourth input mask values and the first, second, third, and fourth output mask values;
a controller configured to provide a first masked input data, a second masked input data, a third masked input data, and a fourth masked input data according to the first, second, third, and fourth input mask values, respectively; and
at least one operator configured to obtain a first masked output data, a second masked output data, a third masked output data, and a fourth masked output data according to the first, second, third, and fourth masked input data and the first addition input mask values, the second addition input mask value, and the addition output mask value of the mask groups,
wherein the controller is configured to provide a stream key according to the first, second, third, and fourth masked output data and the first, second, third, and fourth output mask values, and the stream key conforms to ChaCha20 encryption.

11. The encryptor as claimed in claim 10, wherein the addition mask value generator comprises:
a first operation circuit configured to obtain first intermediate data according to the first output mask value and the fourth output mask value;
a second operation circuit configured to obtain the addition output mask value of a first mask group of the mask groups according to the first intermediate data and the fourth input mask value;
a third operation circuit configured to obtain second intermediate data according to the second output mask value and the third output mask value; and
a fourth operation circuit configured to obtain the addition output mask value of a second mask group according to the second intermediate data and the second input mask value,
wherein the first addition input mask value of the first mask group is the first input mask value, and the second addition input mask value of the first mask group is the second input mask value,
wherein the first addition input mask value of the second mask group is the third input mask value, and the second addition input mask value of the second mask group is the first intermediate data.

12. The encryptor as claimed in claim 11, wherein the first addition input mask value of a third mask group of the mask groups is the same as the addition output mask value of the first mask group, the second addition input mask value of the third mask group is the second intermediate data, and the addition output mask value of the third mask group is the first output mask value.

13. The encryptor as claimed in claim 11, wherein the first addition input mask value of a fourth mask group of the mask groups is the same as the addition output mask value of the second mask group, the second addition input mask value of the fourth mask group is the fourth output mask value, and the addition output mask value of the fourth mask group is the third output mask value.

14. The encryptor as claimed in claim 11, wherein the first operation circuit comprises:
a first cyclic shifter configured to perform an 8-bit right cyclic shift on the fourth output mask value to obtain third intermediate data; and
a first exclusive-OR (XOR) gate configured to receive the third intermediate data and the first output mask value to provide the first intermediate data.

15. The encryptor as claimed in claim 11, wherein the second operation circuit comprises:
a second cyclic shifter configured to perform a 16-bit right cyclic shift on the first intermediate data to obtain fourth intermediate data; and
a second exclusive-OR (XOR) gate configured to receive the fourth intermediate data and the fourth input mask value to provide the addition output mask value of the first mask group.

16. The encryptor as claimed in claim 11, wherein the third operation circuit comprises:
a third cyclic shifter configured to perform a 7-bit right cyclic shift on the second output mask value to obtain fifth intermediate data; and
a third exclusive-OR (XOR) gate configured to receive the fifth intermediate data and the third output mask value to provide the second intermediate data.

17. The encryptor as claimed in claim 11, wherein the fourth operation circuit comprises:
a fourth cyclic shifter configured to perform a 12-bit right cyclic shift on the second intermediate data to obtain sixth intermediate data; and
a fourth exclusive-OR (XOR) gate configured to receive the sixth intermediate data and the second input mask value to provide the addition output mask value of the second mask group.

18. The encryptor as claimed in claim 11, wherein each of the first, second, third, and fourth operation circuits comprises a cyclic shifter and an exclusive-OR (XOR) gate, and each of the cyclic shifters is configured to perform a night cyclic shift on a different number of bits.

19. A method for generating a stream key for ChaCha20 encryption, comprising:
obtaining four output mask values through a random number generator;
performing mask operations on four input values according to four input mask values to obtain individual masked input data;
generating four mask groups according to the four input mask values and the four output mask values, wherein each of the mask groups comprises a first addition input mask value, a second addition input mask value and an addition output mask value;
using the four mask groups to perform corresponding quarter-rounds on the masked input data to obtain corresponding masked output data; and
obtaining a stream key according to the masked output data and the four output mask values.

20. The method as claimed in claim 19, wherein the four input mask values are the four output mask values randomly generated in a previous clock cycle.

* * * * *